(12) United States Patent
Takano et al.

(10) Patent No.: US 8,705,354 B2
(45) Date of Patent: Apr. 22, 2014

(54) COMMUNICATION SYSTEM AND COMMUNICATION CONTROL METHOD

(75) Inventors: Yusuke Takano, Tokyo (JP); Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 152 days.

(21) Appl. No.: 13/395,360

(22) PCT Filed: Sep. 17, 2010

(86) PCT No.: PCT/JP2010/066215
§ 371 (c)(1),
(2), (4) Date: Mar. 9, 2012

(87) PCT Pub. No.: WO2011/034175
PCT Pub. Date: Mar. 24, 2011

(65) Prior Publication Data
US 2012/0170454 A1 Jul. 5, 2012

(30) Foreign Application Priority Data

Sep. 18, 2009 (JP) ................................ 2009-217755
Nov. 9, 2009 (JP) ................................ 2009-256493

(51) Int. Cl.
*H04L 12/26* (2006.01)
*H04W 4/00* (2009.01)
*H04L 12/56* (2011.01)
*G06F 15/16* (2006.01)

(52) U.S. Cl.
USPC ........... 370/230; 370/331; 370/338; 370/400; 455/432.1; 709/229

(58) Field of Classification Search
USPC ................ 370/216–226, 229–240, 241–258, 370/310–350, 400–411, 431–437, 464–465, 370/477; 455/431–466; 709/217–229, 709/230–253
See application file for complete search history.

(56) References Cited

U.S. PATENT DOCUMENTS

| | | | | |
|---|---|---|---|---|
| 2011/0274087 A1* | 11/2011 | Liang et al. | ................... | 370/331 |
| 2012/0170495 A1* | 7/2012 | Zhou et al. | ................... | 370/310 |
| 2012/0207137 A1* | 8/2012 | Zhou et al. | ................... | 370/331 |
| 2013/0058292 A1* | 3/2013 | Wang et al. | ................... | 370/329 |
| 2013/0148621 A1* | 6/2013 | Laitila et al. | .................. | 370/329 |
| 2013/0308527 A1* | 11/2013 | Chin et al. | ................... | 370/328 |

OTHER PUBLICATIONS

International Search Report, PCT/JP2010/066215, Oct. 19, 2010.
3GPP, Service requirements for Home NodeBs and Home eNodeBs (Release 9), 3 GPP TS 22.220, V9.1.3 (Jun. 2009), 3GPP, Jun. 22, 2009.
CATT, Indication of Local IP Access, 3GPP TSG RAN WG2 Meeting #66bis, R2-093764, 3GPP, 2009.
Makato Fujinami, Jun Awano, Yasuhiro Mizukoshi, "Femtocell no Hyojunka Doko to Sono Kaidai ni Tsuite no Ichikento", The Institute of Electronics, Information and Communication Engineers 2009 Nen The Communications Society Taikai Koen Ronbunshu 2, Sep. 15, 2009, pp. S-11, S-12.

(Continued)

*Primary Examiner* — Tri H Phan
(74) *Attorney, Agent, or Firm* — Young & Thompson

(57) ABSTRACT

A node on a core network, in accordance with a connection state of a terminal, releases a transmission path resource which is made unnecessary due to LIPA (Local IP access) or SIPTO (Selected IP traffic offload) connection configuration.

20 Claims, 18 Drawing Sheets

TYPICAL LIPA/ SIPTO CONNECTION MODEL WITH UE IN THE ECM-CONNECTED MODE

(56) References Cited

OTHER PUBLICATIONS

Vodafone, Verizon Wireless, BT, Huawei Technologies, Selected IP Traffic Offload, 3GPP TSG-SA WG1 Meeting #47, S1-093341, 3GPP, 2009.
Huawei Technologies, China Mobile, Vodafone, Verizon Wireless, AT&T, Qualcomm Europe, Alcatel-Lucent, NEC, Samsung, Panasonic, BT, ZTE, Update to the SA2 WID for Local IP Access & Internet Offload, 3GPP TSG-SA WG1 Meeting #47, S1-093338, 3GPP, Aug. 3, 2009.
3GPP TSG WG2 Meeting #75—Local GW based Architecture, Aug. 31- Sep. 4, 2009, pp. 1-8, Kyoto, Japan, TD S2-096015.
Chinese Official Action , 201080040154.3, Jan. 6, 2014.

* cited by examiner

FIG. 5

| BEARER SORTS | CONNECTION STATE/ CONNECTION CONFIGURATION | | |
|---|---|---|---|
| | DIRECT CONNECTION TO OUTSIDE | IDLE STATE | ORDINARY |
| GBR | NO BANDWIDTH SECURED | MINIMUM BANDWIDTH SECURED | REQUESTED BANDWIDTH SECURED |
| Non-GBR | NO BANDWIDTH SECURED | NO BANDWIDTH SECURED | NO BANDWIDTH SECURED |

TYPICAL LIPA/ SIPTO CONNECTION MODEL WITH UE IN THE ECM-CONNECTED MODE

COMMUNICATION SYSTEM AND COMMUNICATION CONTROL METHOD

CROSS-REFERENCE TO RELATED APPLICATIONS

The present application asserts priority rights based on JP Patent Application 2009-217755 filed in Japan on Sep. 18, 2009 and on JP Patent Application No. 2009-256493 filed on Nov. 9, 2009. The total contents of disclosures of these Patent Applications of the senior filing dates are to be incorporated by reference into the present Application.

This invention relates to a communication system and, more particularly, to a system and a method for optimizing transmission path resources.

TECHNICAL FIELD

Background

With the increase in the volume of user communication, in 3 GPP (Third Generation Partnership Project) standardization, a study is currently being made of the technique that enables a terminal (User Equipment: UE) to access to an external network directly from a radio access network of a service area in which the terminal stays, without capturing a user traffic into the EPC (Evolved Packet Core), as in LIPA (Local IP access); or SIPTO (Selected IP traffic offload). It is noted that the LIPA/SIPTO system provides a mechanism of directly connecting a radio base station, a radio control apparatus or a simple structure type radio apparatus, such as Femto base station, to an external network.

SUMMARY

The following describes an analysis by the present inventors. The special access methods, such as LIPA or SISTO, and ordinary access methods, may coexist in future. Under such situation, it may become necessary to efficiently exploit network resources.

FIG. 1 shows a connection network configuration of LTE (Long Term Evolution)/EPC. A terminal (UE) 1 communicates with a radio station (evolved Node-B: eNB) 2 via a radio transmission path 7. When the terminal (UE) 1 is engaged in communication, connection is set up via a radio transmission path 7, an S1 transmission path 8 and an S5 transmission path 9, thus allowing the terminal (UE) 1 to have communication with the service network (Service Network) 6. At this time, to secure the communication quality, such as QoS (Quality of Service), each apparatus or component secures transmission path resources, depending on services to be provided.

An MME (Mobility Management Entity) 3 of FIG. 1 is a control node that manages the mobility and that takes part in bearer activation and deactivation. For example, the MME performs S-GW selection for the UE at a time point of initial attachment of the UE and intra-LTE handover, while also performing user authentication in conjunction with an HSS (Home Subscriber Server), not shown.

The S-GW (Serving Gateway) 4 performs routing of a user data packet to forward the user data packet. The S-GW 4 also operates as a mobility anchor for a user plane during handover between eNBs, and as a mobility anchor for the LTE and other 3 GPP systems. A P-GW (PDN (Packet Data Network)— Gateway) 5 connects the EPC to the service network 6 which is an external packet network.

FIG. 2 is a diagram for illustrating the problem to be solved by the present invention. Referring to FIG. 2, there is shown a network configuration for directly accessing from a radio access network (RAN) to an external network (Internet/Cooperate network). In the configuration shown in FIG. 2, a packet is directly transferred from the radio access network via an LPGW (Local Packet data network Gateway) to the external network. Hence, no packet flows on the S1 transmission path or on the S5 transmission path, even though the terminal (UE) is actually having communication. In FIG. 2, the eNB is drawn as united with the LPGW (Local PDN GW) to transfer a packet from the radio access network directly to outside or from the external network directly to the radio access network.

In the configuration of FIG. 2, as a derivative of the usual LTE/EPC connection configuration, the procedure for transmission path setup is the same as that of the ordinary LTE/EPC from the standpoint of achieving common processing.

Thus, in the configuration of FIG. 2, it is a problem to make optimum exploitation of resources of the S1 transmission path and the S5 transmission path, in short, to optimize the transmission path resource managed by the S-GW.

Since with LIPA/SIPTO connection, entire user traffics are connected from a LIPA/SIPTO compatible apparatus directly to an external network, that is, not via an operator's network, it is not necessary for the operator to provide network resources required to implement user communication, thereby providing a significant cost merit. However, since it is presupposed that a subscriber is moving from the LIPA/SIPTO compatible apparatus to other base station, resources needed for normal connection with an external network are allocated in an operator network (EPC(Evolved Packet Core) network). It is thus desired in the EPC for LIPA/SIPTO access to enable optimizing a GBR (Guaranteed Bit Rate) transmission path to secure the cost merit of LIPA/SIPTO connection to the maximum extent possible.

It is therefore an object of the present invention to provide a system and a method that will enable optimizing the use of transmission resources in mobile communication.

It is another object of the present invention to provide a system and a method that will enable optimizing the GBR (guaranteed bit rate) transmission path in the EPC for LIPA/SIPTO access.

According to the present invention, unneeded resources are released in mobile communication, depending on the connection configuration, such as to optimize the use of transmission path resources. According to the present invention, there is provided a communication method in which a node on a core network, in accordance with a connection state of a terminal, releases a transmission path resource which is made unnecessary due to LIPA (Local IP access) or SIPTO (Selected IP traffic offload) connection configuration.

According to the present invention, there is provided a system in which a core network, when recognizing LIPA/SIPTO connection, captures minimum necessary resources. According to the present invention, there is provided a communication system, wherein a node on a core network, in accordance with a connection state of a terminal, releases a transmission path resource which is made unnecessary due to LIPA (Local IP access) or SIPTO (Selected IP traffic offload) connection configuration. The communication system is connected to an external packet network without catching an interface resource between a radio access network and the core network, and provides a resource to the other interface installed in the core network. More specifically, the S1 interface interconnecting the radio control network and the core network is controlled so as not to be provided with a resource.

S5/S8 interface needed in a core network is controlled so that it is supplied with minimum necessary resources.

According to the present invention, the terminal connects directly from the radio access network to the external packet network, without catching an interface resource between the radio access network and the core network, such as to provide a resource to the other interface in the core network.

According to the present invention, use of a transmission path resource may be optimized.

According to the present invention, a GBR (guaranteed bit rate) transmission path in the EPC for LIPA/SIPTO access may be optimized to secure cost merit of LIPA/SIPTO connection to the utmost extent possible.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 5 is a diagram showing an example of securing resources in the exemplary embodiment 1 of the present invention.

PREFERRED MODES

The following describes exemplary embodiments of the present invention. According to the present invention, when a transmission path is set up, an MME (mobility management entity) notifies an S-GW (Serving Gateway) of the connection configuration of a terminal (UE). The S-GW accordingly secures transmission path resources in a proper manner to optimize transmission path resources.

In an exemplary embodiment of the present invention, a base station (eNB) informs the MME, at the time of connection setup of the S1 transmission path between the base station and the mobility management entity (MME), about whether or not the base station has the ability to transfer a packet directly from a radio access network to an external network. In response to a request for connection setup from the terminal (UE) to the base station (eNB), the MME selects the connection configuration to be notified to the S-GW, based a network as a destination of connection specified in the request for connection setup and the capability information of the base station. The MME notifies the S-GW of the connection configuration. The S-GW secures at least the resources of transmission paths to which the S-GW connects, and releases unneeded transmission path resources, in accordance with the connection configuration notified by the MMW.

In another exemplary embodiment of the present invention, the S-GW notifies the state of connection of the S-GW to a P-GW (PDN Gateway) connecting to an external packet network, based on the connection configuration notified. The P-GW and the S-GW perform the optimization of at least transmission path resources between the P-GW and the S-GW based on the connection configuration notified.

In another exemplary embodiment of the present invention, a context releasing request by the terminal which is in a non-communicating state may be sent from the base station to the MME. The MME may then request the S-GW to remove the information regarding the transmission path between the MME and the base station. The MME at this time may append to the removal request a connection state that the UE is in the non-communicating state, and may send the resulting signal to the S-GW. The S-GW may then notify to the P-GW that the terminal is in a non-communicating state. The S-GW and the P-GW may then optimize the transmission path resource already secured.

In another exemplary embodiment of the present invention, an SGSN (Serving GPRS Support Node) may notify the connection state to a GGSN (Gateway GPRS Support Node). The GGSN may then optimize the transmission path resource between the GGSN and the SGSN based on the connection state notified.

Figure 1:
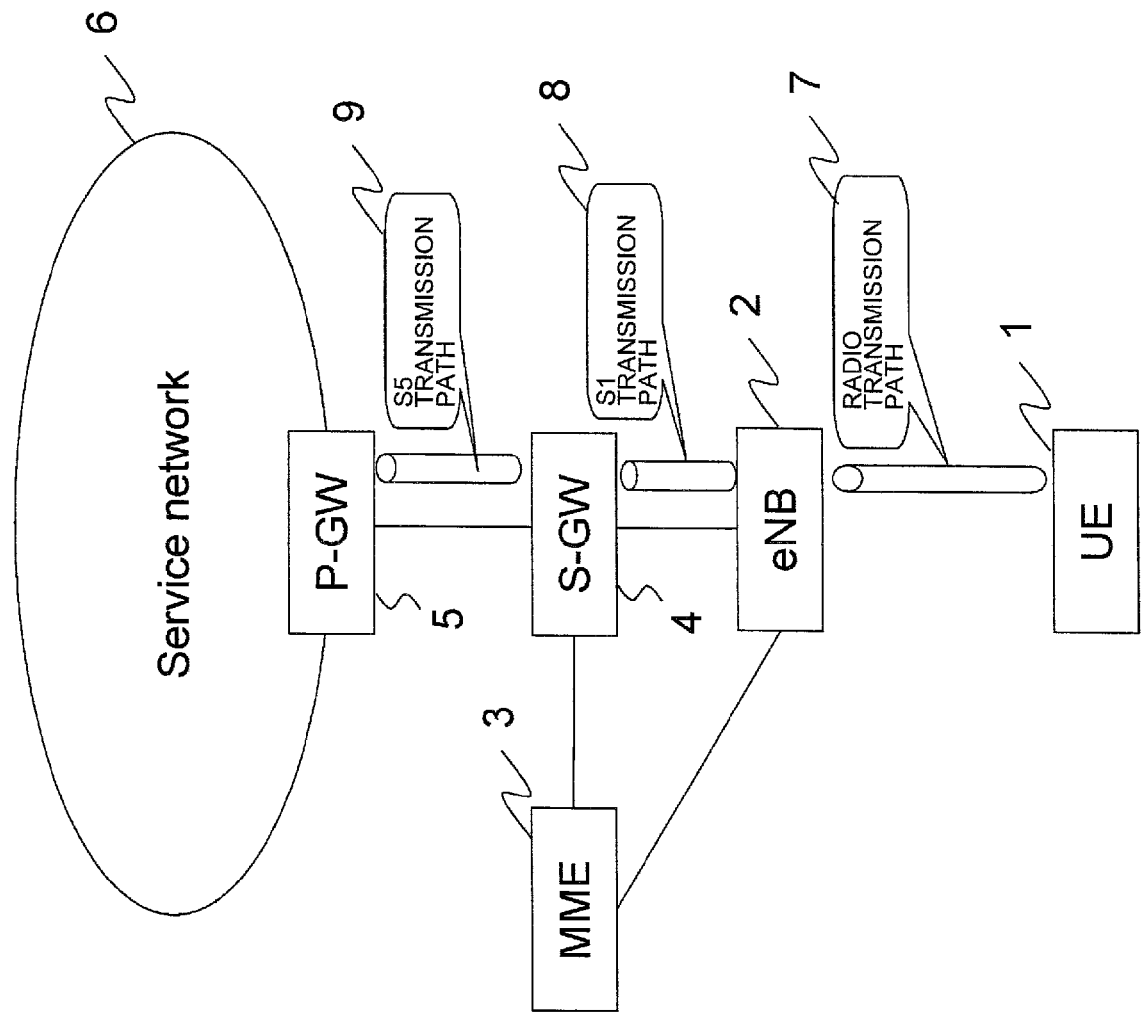
FIG. 1 is a diagram showing a configuration of an LTE/EPC mobile network.
Figure 2:
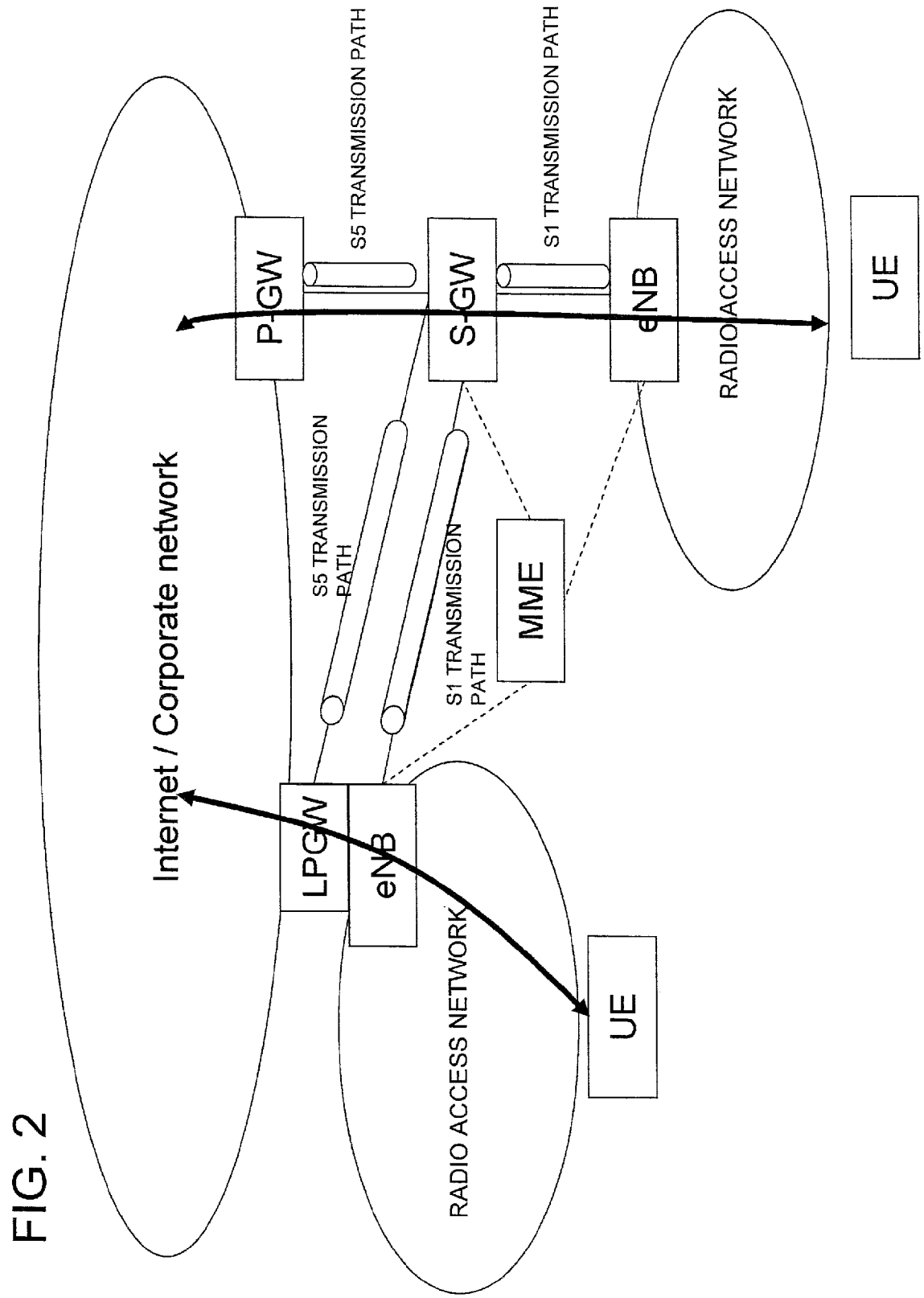
FIG. 2 is a diagram showing a network configuration of direct connection from the radio access (Radio Access) network to outside.

FIG. 2 shows a network configuration of directly accessing from a radio access network to an external network. Referring to FIG. 2, the eNB is united with an LPGW (Local PDN GW) and has the function of directly transferring a packet from the radio access (Radio Access) network to outside and from the external network to the radio access (Radio Access) network.

Exemplary Embodiment 1

Figure 3:
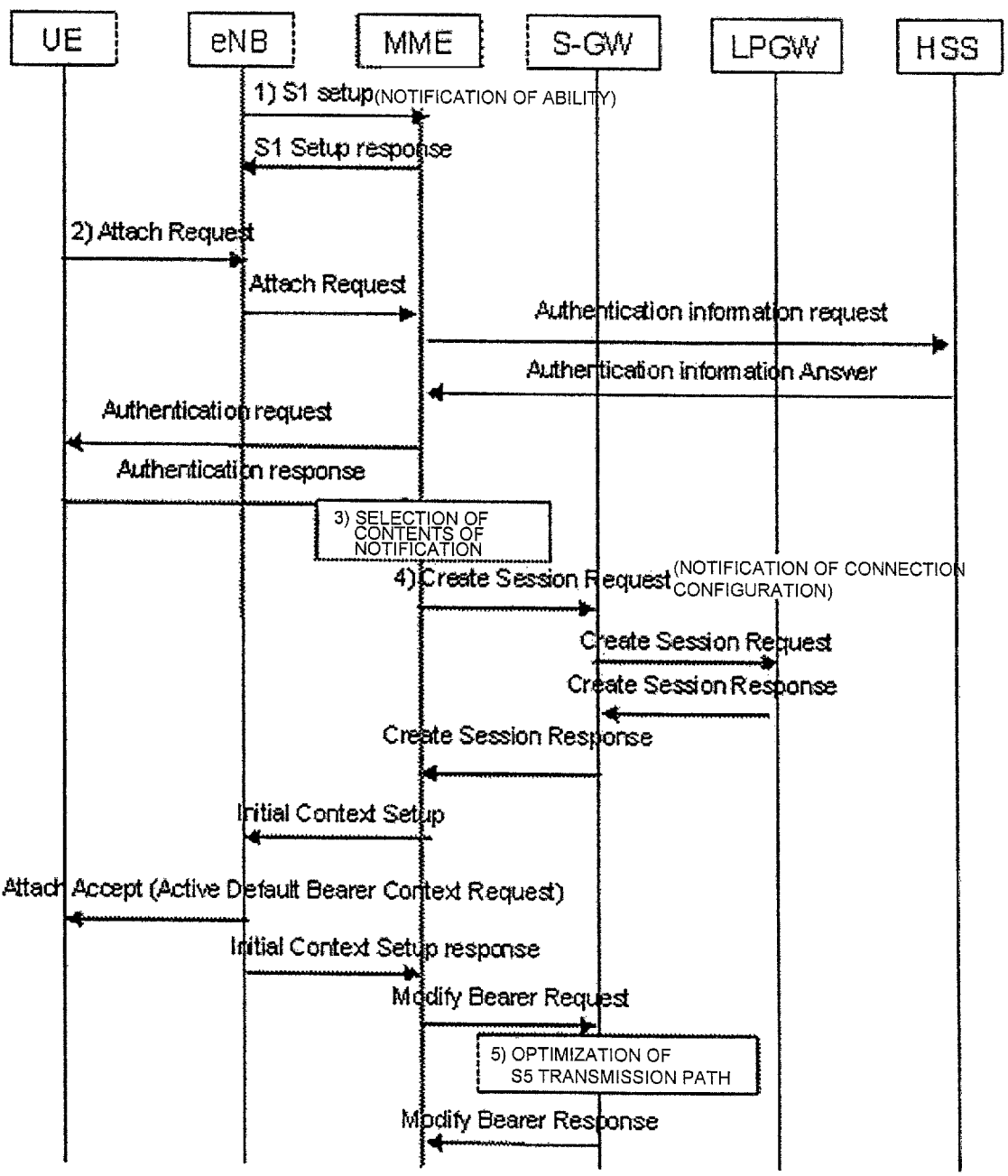
FIG. 3 is a sequence diagram showing a sequence of optimizing a S5 transmission path in an exemplary embodiment 1 of the present invention.

FIG. 3 is a diagram for illustrating a sequence for optimizing an S5 transmission path in one exemplary embodiment of the present invention. Referring to FIG. 3, there are shown a procedure for S1 setup (S1 Setup) and a procedure for registering a terminal in a network and for setting up a transmission path.

1) Ability Notification at the Time of Connection Setup

An eNB sets up connection by setup of S1 as an interface between the eNB and an MME (S1 Setup). At the same time, the eNB appends to a normal signal the information on whether or not the eNB has the ability to directly transfer a packet from the radio access network to the external network, and sends the signal with the capability information to the MME (notification of the ability).

The MME receives the notification and maintains the eNB's ability. An S1 setup response (S1 Setup Response) is sent from the MME to the eNB.

2) Attach Request (Attach Request)

The registration in the network and a connection setup request (Attach Request) are sent from the terminal (UE) to the eNB. The eNB notifies the MME of the connection setup request (Attach Request).

The MME receives the connection setup request (Attach Request) from the eNB, and sends an authentication information request (Authentication Information Request) to an HSS (Home Subscriber Server) that manages the service profile information. The MME receives an authentication information answer (Authentication Information Answer) from the HHS and sends an authentication request (Authentication Request) to the UE to receive an authentication response (Authentication Response) from the UE.

3) Selection of Contents of Notification

Figure 4:
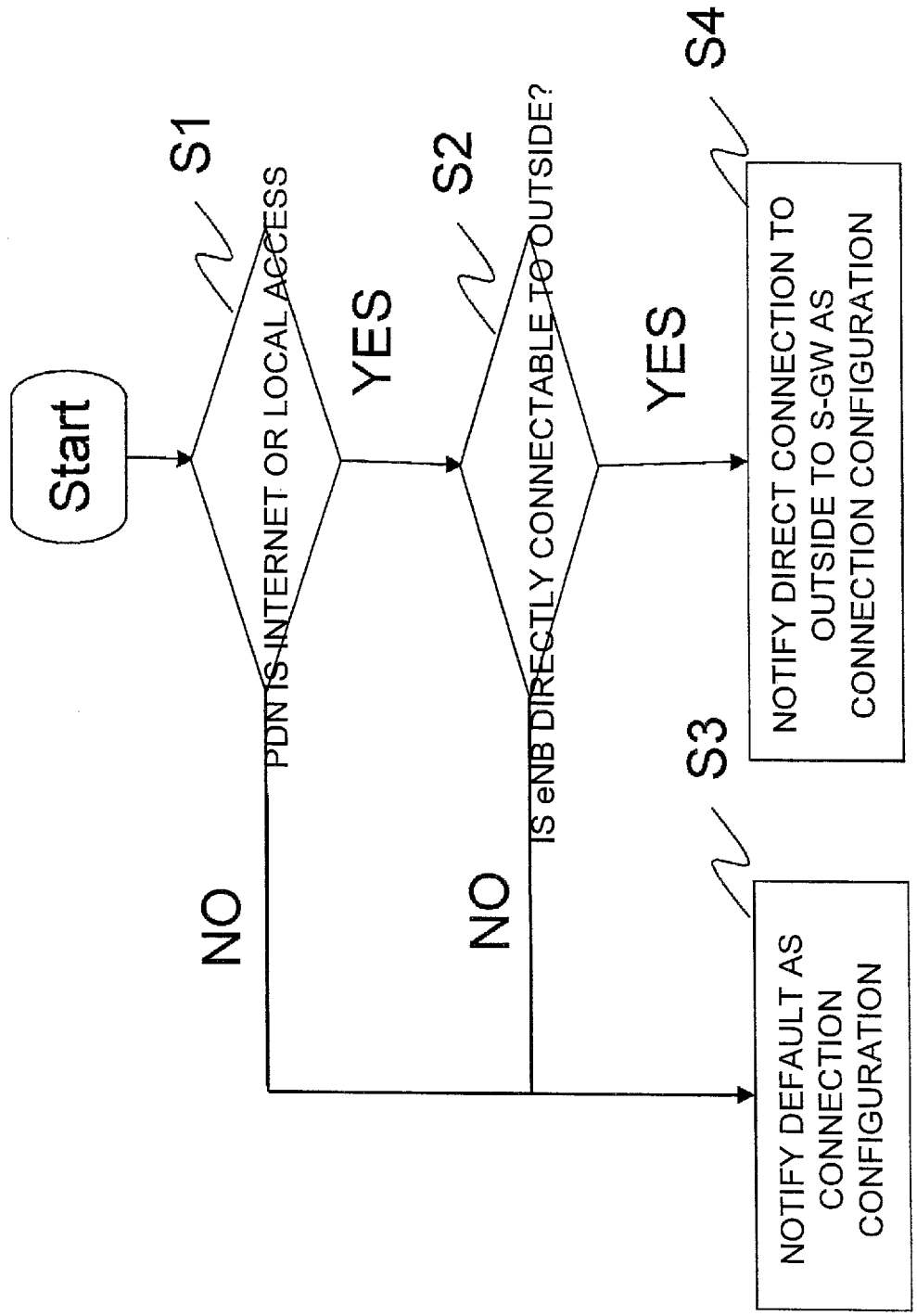
FIG. 4 is a diagram for illustrating the selection of contents of notification in an MME in the exemplary embodiment 1 of the present invention.

The MME performs the authentication (Authentication) and then selects, as shown in FIG. 4, the connection configuration to be notified to the S-GW, from the connection destination network, specified in the connection setup request, and from the ability of the eNB received in 1).

Referring to FIG. 4, in case the PDN is the Internet or the Local Access (YES of step S1), and the eNB is directly connectable to the external network (YES of step S2), the MME notifies the S-GW of direct connection to outside, as the connection configuration (step S4). If the results of decisions at steps S1 and S3 are NO, the MME notifies the S-GW of default as the connection configuration (step S3).

4) Notification of Connection Configuration

The MME appends the connection configuration, selected in the procedure of FIG. 4, to the normal request for transmission path setup, and notifies it to the S-GW. That is, the MME notifies the connection configuration in a create session request (Create Session Request).

On receiving the create session request (Create Session Request) from the MME, the S-GW sends the create session request (Create Session Request) to the LPGW. On receiving the create session request (Create Session Request) from the LPGW, the S-GW returns a response (Create Session Response) to the MME.

The MME notifies the eNB of initial context setup (Initial Context Setup), and the eNB transmits attach accept (Attach Accept) in response to an attach request (Attach Request) from the terminal of 2).

The eNB sends to the MME an initial context response (Initial Context Setup Response) responsive to the initial context setup (Initial Context Setup) from the MME, which MME then sends a modify bearer request (Modify Bearer Request) to the S-GW.

5) In finally completing the connection procedure, the S-GW secures resources of the S1 transmission path and the S5 transmission path, taking the connection configuration into account (transmission path optimization of 5) of FIG. 3), as shown in FIG. 5.

In the Example shown in FIG. 5, there are a direct external connection, idle state and a normal state, as bearer types.

As for GBR (Guaranteed Bit Rate), no bandwidth is secured for the direct external connection, a minimum bandwidth is secured for the idle state and a bandwidth requested is secured for the normal state.

As for the Non-GBR (Non-Guaranteed Bit Rate), no bandwidth is secured for any of the direct external connection, idle state or the normal state.

In case connection is made directly from the radio access network to the external network, and the connection services are those that guarantee the bandwidth, the S-GW resources, normally necessary to secure, do not have to be secured (GBR, Non-GBR: No bandwidth guaranteed). The corresponding communication path resources may be allocated to other connections, thus optimizing network resources.

Exemplary Embodiment 2

Figure 6:
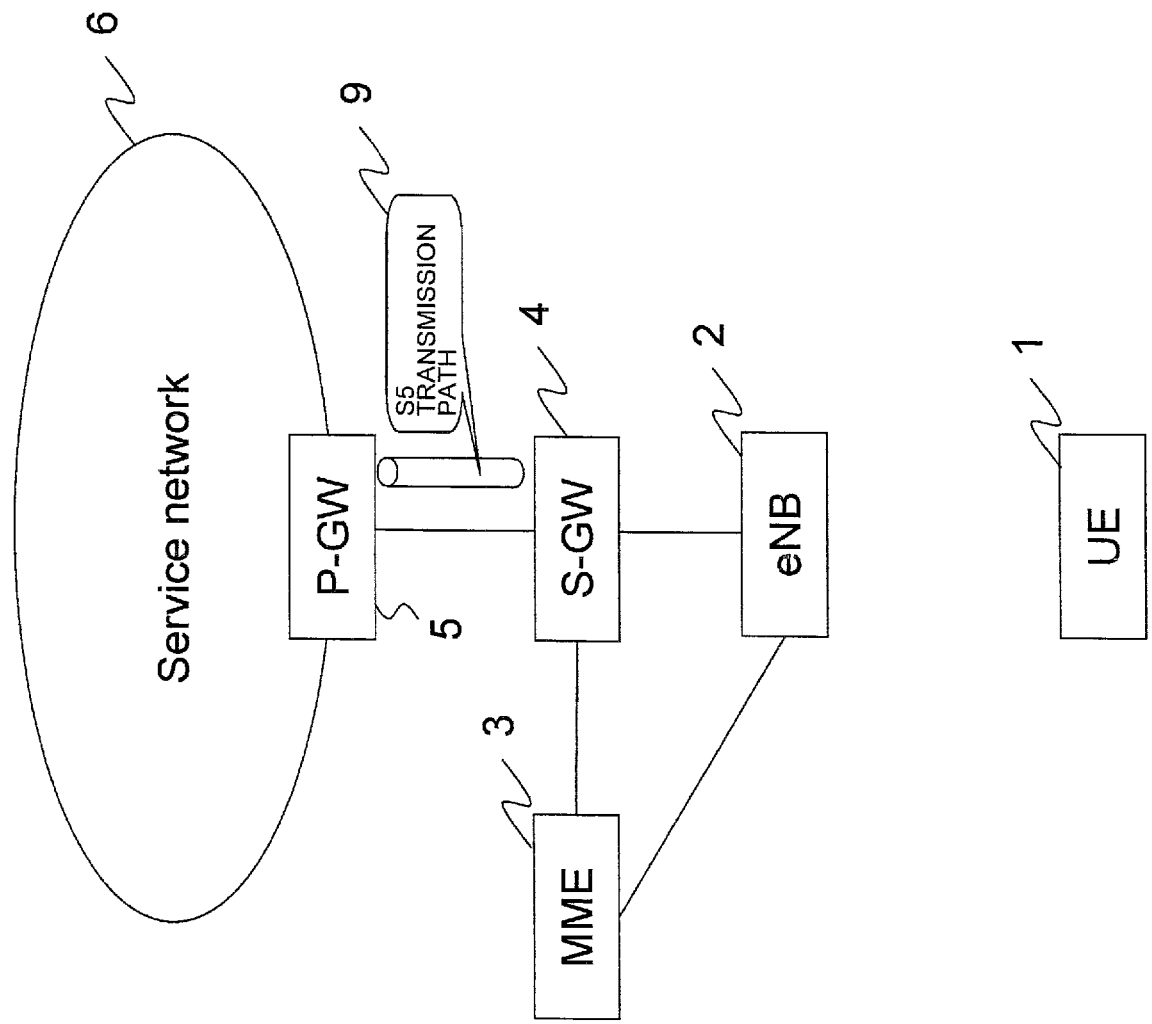
FIG. 6 is a diagram showing a transmission path in an exemplary embodiment 2 of the present invention, with a terminal in an Idle state.

The following describes an exemplary embodiment 2 of the present invention. FIG. 6 shows a state in which a terminal (UE) performs registration to a network (Attach) and, after securing a transmission path, the terminal is in an idle (Idle) state, that is, in a non-transmitting state. At this time, the resources of the radio transmission path as well as those of the S1 transmission path are released. Note that, during the idle (Idle) state, the UE is in a power supply saving state and no packet is transmitted or received. During the idle state, no context of the terminal (UE) is stored in the eNB. However, even in such a state, in which no transmission packet flows on the S5 transmission path, resources are being secured. It is necessary to make optimum use of these resources.

Figure 7:
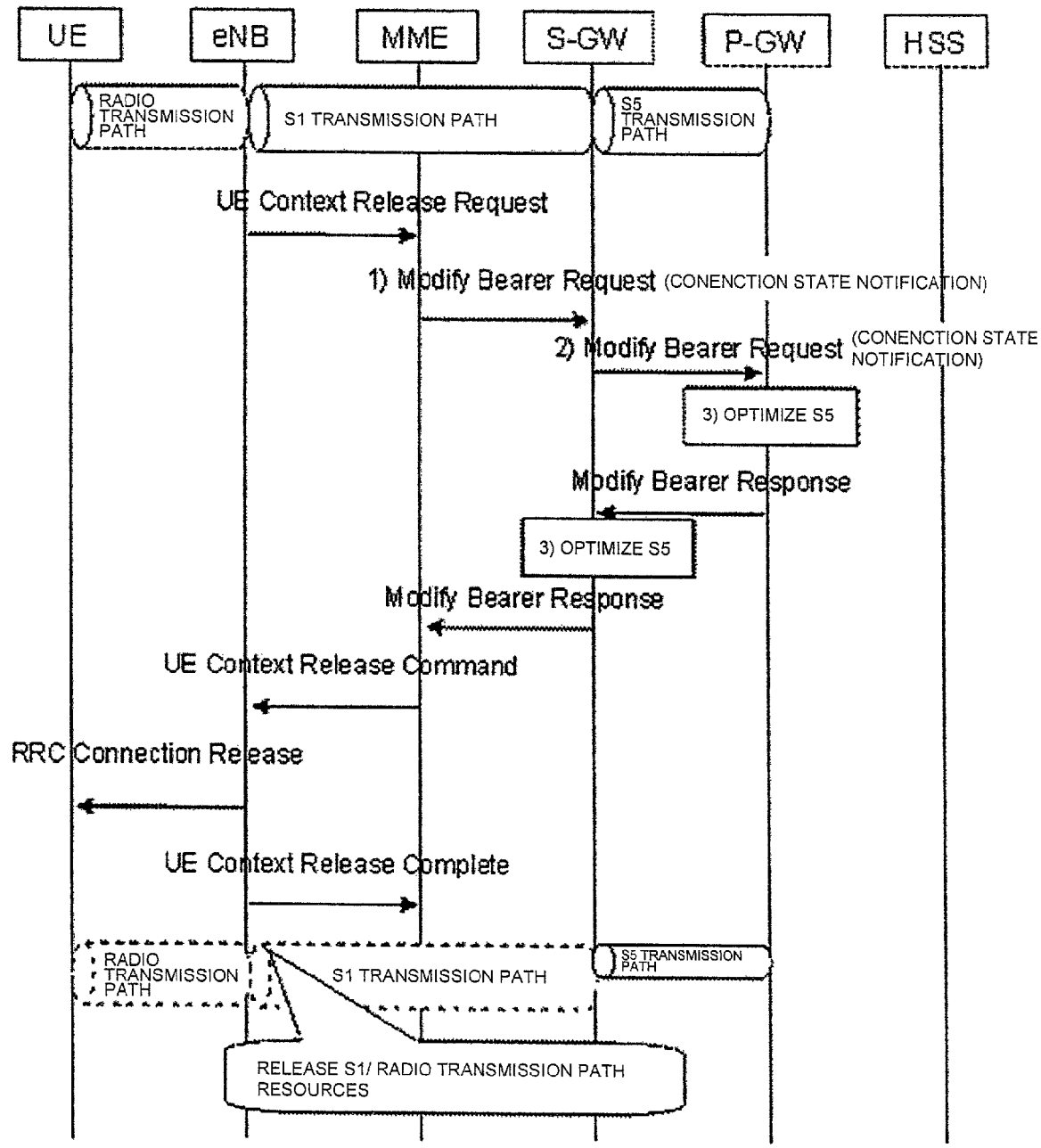
FIG. 7 is a sequence diagram showing a procedure of optimizing an S5 transmission path (S5 GTPv2) in the exemplary embodiment 2 of the present invention.

FIG. 7 shows the procedure for releasing the S1 transmission path in case the GTPv2 (GPRS (General Packet radio Service) Tunneling Protocol) protocol is applied to the S5 interface, with the UE in the idle state (in non-communicating state). The following describes the procedure of releasing the S1 transmission path, with reference to FIG. 7. A UE context release request (UE Context Release Request) is sent from the eNB to the MME.

1) Notification of Connection State

On receiving the UE context release request (UE Context Release Request) from the eNB, the MME sends to the S-GW a modify bearer request (Modify Bearer Request) that requests deletion of the information regarding the S1 transmission path. At this time, the MME appends to the usual deletion request a connection state that the UE is in non-communicating state, and sends the resulting signal to the S-GW.

2) Notification of the Connection State

On receiving the modify bearer request (Modify Bearer Request) from the MME, the S-GW notifies to a P-GW that the terminal (UE) becomes to be in a non-communicating state.

3) S5 Re-Optimization

The S-GW and the P-SW perform optimization of the resources of the S5 transmission path, already secured, depending on conditions, as shown in FIG. 5.

The S-GW sends a response (Modify Bearer Response) to the MME. The MME sends a UE context release command (UE Context Release Command) to the eNB.

The eNB sends a radio resource control connection release (RRC (Radio Resource Control) Connection Release) to the UE. Thereafter, the eNB sends to the MME a UE context release complete (UE Context Release Complete). This releases S1 transmission path/radio transmission path resources.

Figure 8:
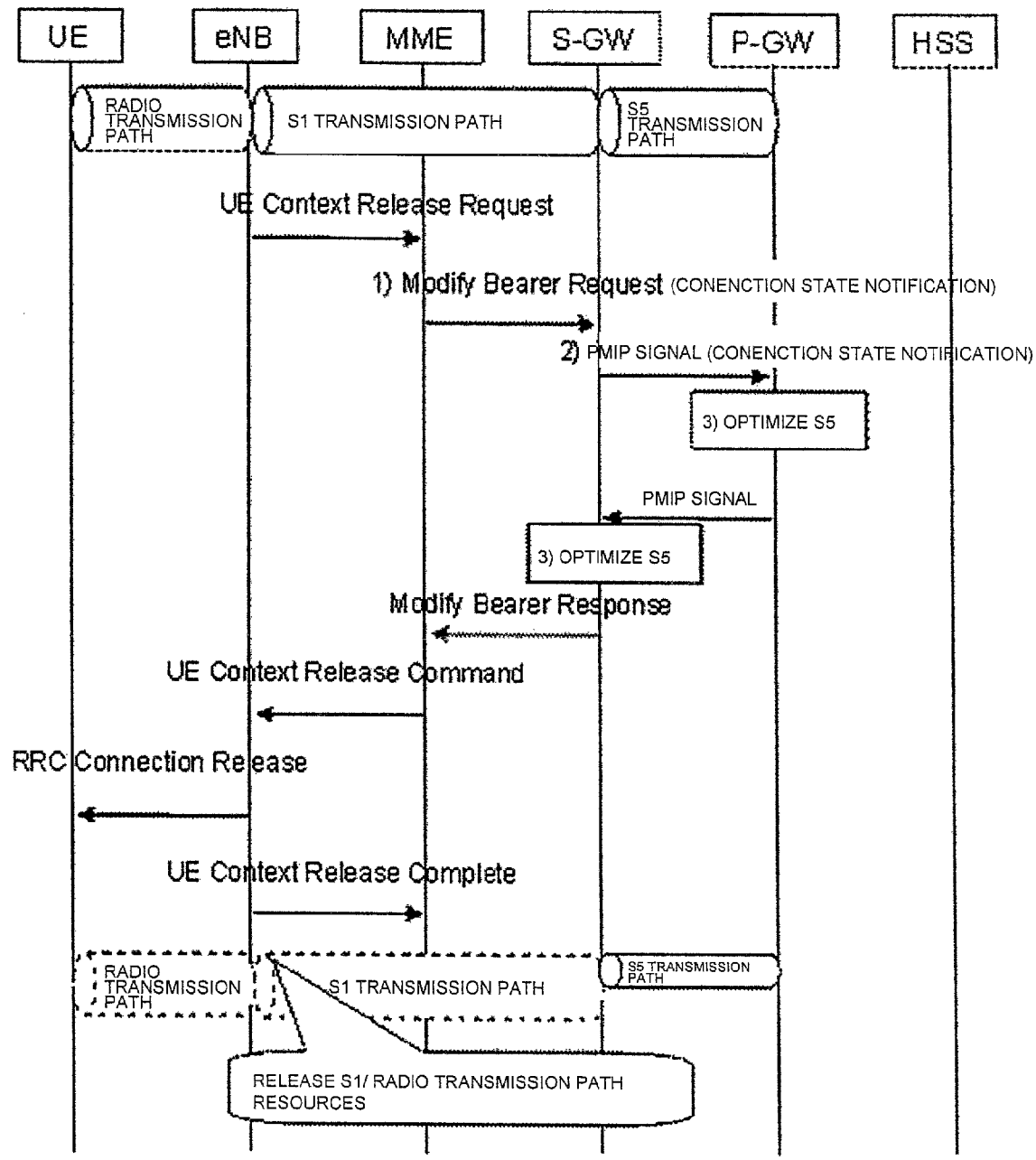
FIG. 8 is a sequence diagram showing a procedure of optimizing an S5 transmission path (S5 MPIV) in a modification of the exemplary embodiment 2 of the present invention.

The following describes a modification of the present exemplary embodiment. FIG. 8 shows a procedure which is the same as that in case PMIP (Proxy Mobile IP) protocol is applied to the S5 interface. A UE context release request (UE Context Release Request) is sent from the eNB to the MME.
1) Notification of Connection State On receiving the UE context release request (UE Context Release Request) from the eNB, the MME requests the S-GW to delete the information regarding the S1 transmission path (Modify Bearer Request). At this time, the MME appends to the normal request for deletion a connection state that the UE is in the non-communicating state, and sends the resulting signal to the S-GW.
2) Notification of Connection State On receiving the modify bearer request (Modify Bearer Request) from the MME, the S-GW notifies to the P-GW, by the signal PMIP, that the UE has fallen into the non-communicating state.
3) S5 Optimization The P-GW and the S-GW perform optimization of the S5 transmission path resources already acquired. The procedure following this is the same as that shown in FIG. 7 and hence the corresponding explanation is dispensed with.

Exemplary Embodiment 3

Figure 9:
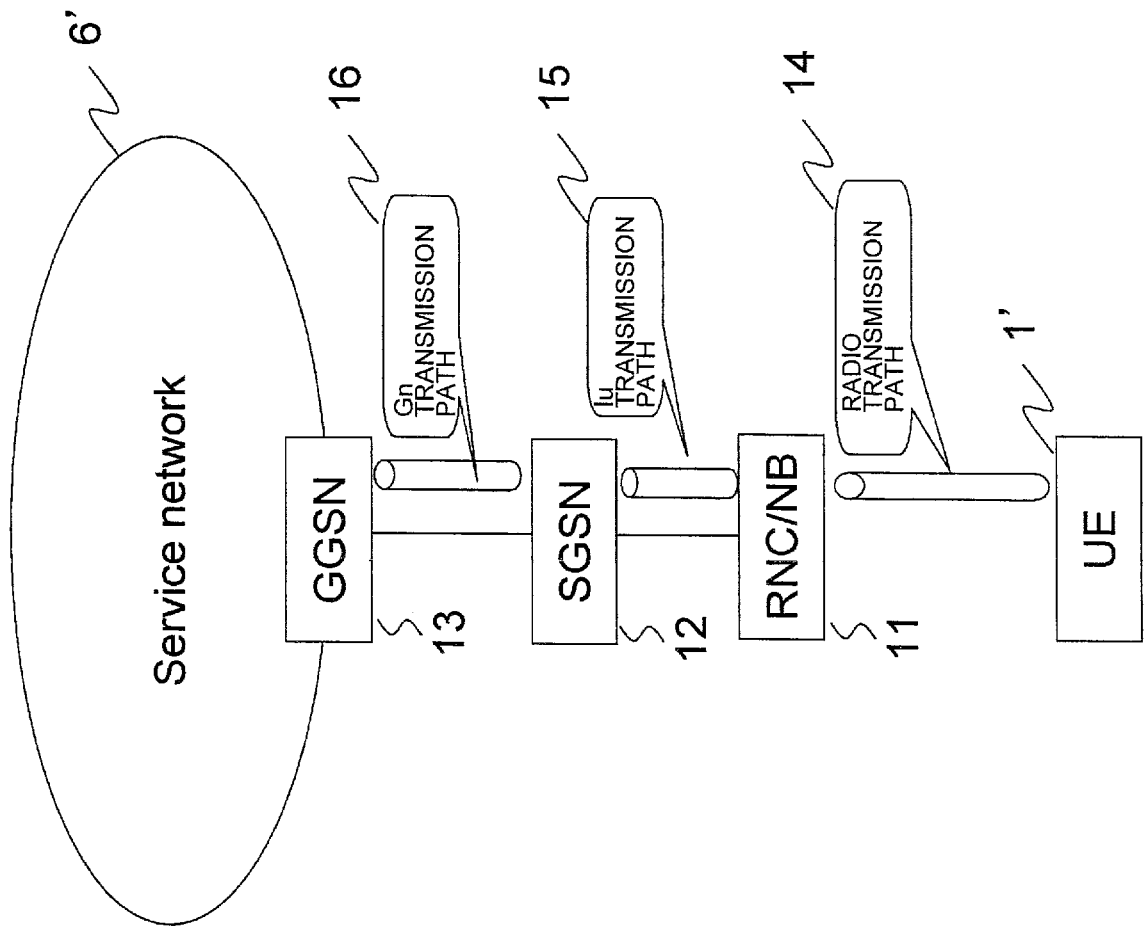
FIG. 9 is a diagram showing a 3 GPP mobile network in an exemplary embodiment 3 of the present invention.

The following describes a third exemplary embodiment of the present invention. FIG. 9 shows a network configuration to which a 3G (third generation) mobile communication is applied. When a terminal (UE) 1' is engaged in communication, a radio transmission path 14, a 1u transmission path 15 between RNC (Radio Network Controller)/NB (Node B) and SGSN (Serving GPRS Support Node) and a Gn transmission path 16 between SGSN and GGSN (Gateway GPRS Support Node) are set up, as shown in FIG. 9, thus allowing the terminal (UE) 1 to have communication with a service network (Service Network) 6' as an external network. The respective apparatuses secure transmission path resources to secure communication quality, such as QoS (Quality of Service), depending on services rendered.

Figure 10:
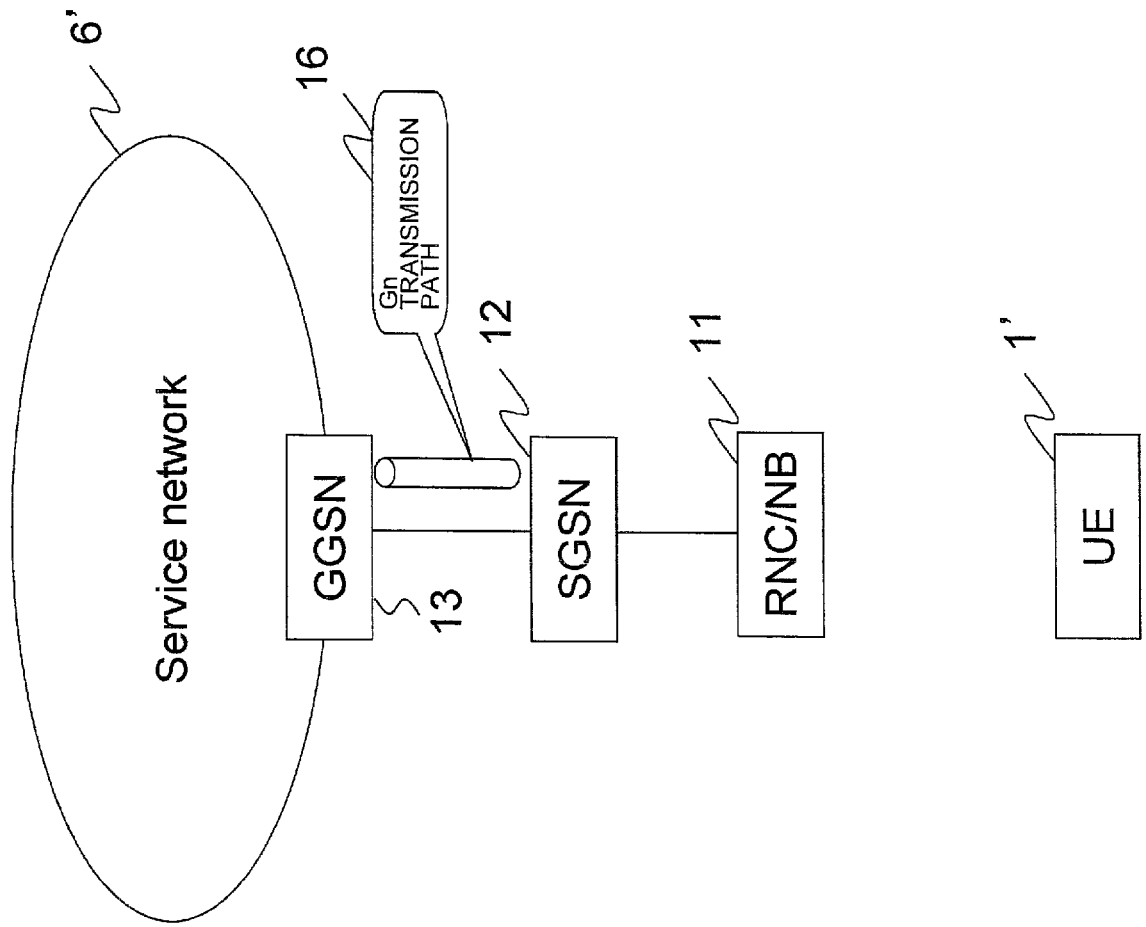
FIG. 10 is a diagram showing a transmission path in the exemplary embodiment 3 of the present invention, with a terminal in Idle state.

FIG. 10 shows a state in which the terminal (UE) has registered to a network and, after securing a transmission path, becomes to be in an idle state (non-transmitting state). At this time, the resources of the radio transmission path and the 1u transmission path are released.

However, even in such case, resources are being secured on the 1u transmission path 16, even though no communication packet flows. It is necessary to make optimal use of these resources.

Figure 11:
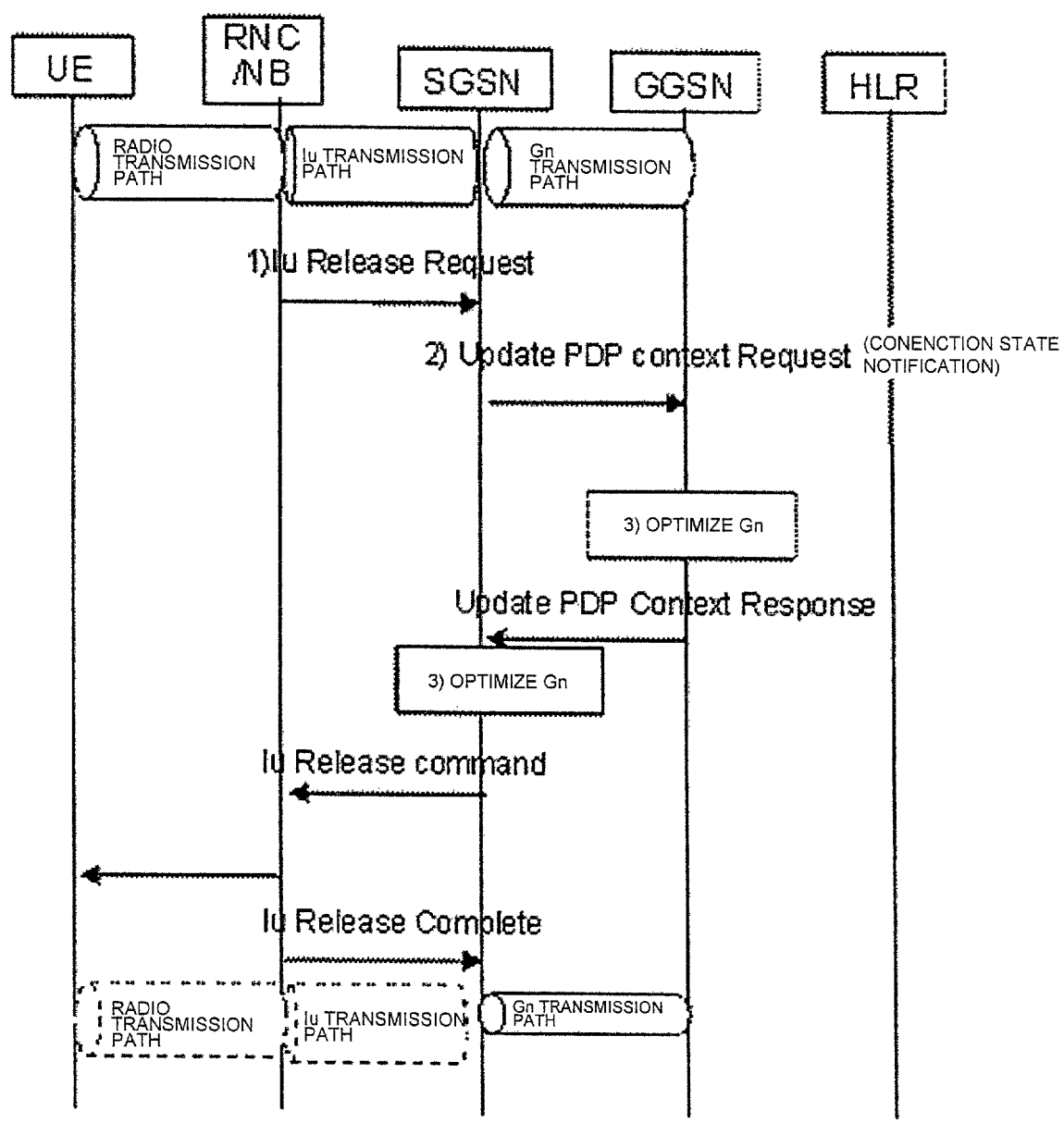
FIG. 11 is a sequence diagram showing an optimizing procedure of an S5 transmission path (S5 GTPv2) in the exemplary embodiment 3 of the present invention.

FIG. 11 shows the procedure for releasing the 1u transmission path, with the terminal (UE) shown in FIG. 10 in the idle state (non-transmitting state).
1) Release Request (Release Request)

The RNC requests the SGSN to delete the information regarding the 1u transmission path.

2) Notification of Connection State (Update PDP Context Request)

Using a signal requesting to change the transmission path, the SGSN notifies to the GGSN that the UE becomes to be in a non-communicating state.
3) Optimizing Gn The SGSN and the GGSN perform optimization of Gn transmission path resources for the UE that has fallen into the non-communicating state. On receiving a response (Update PDP context Response) from the GGSN that performed optimization of the Gn transmission path resources, the SGSN performs optimization of the Gn transmission path resources. The SGSN then transmits a 1u release command (1u Release Command) to the RNC/NB. The RNC/NB then disconnects the radio transmission path for UE and returns a 1u release complete (1u Release Complete) to the SGSN. As a result, the radio transmission path between the UE and RNC/NB and the 1u transmission path between RNC/NB and SGSN are released.

Exemplary Embodiment 4

Figure 12:
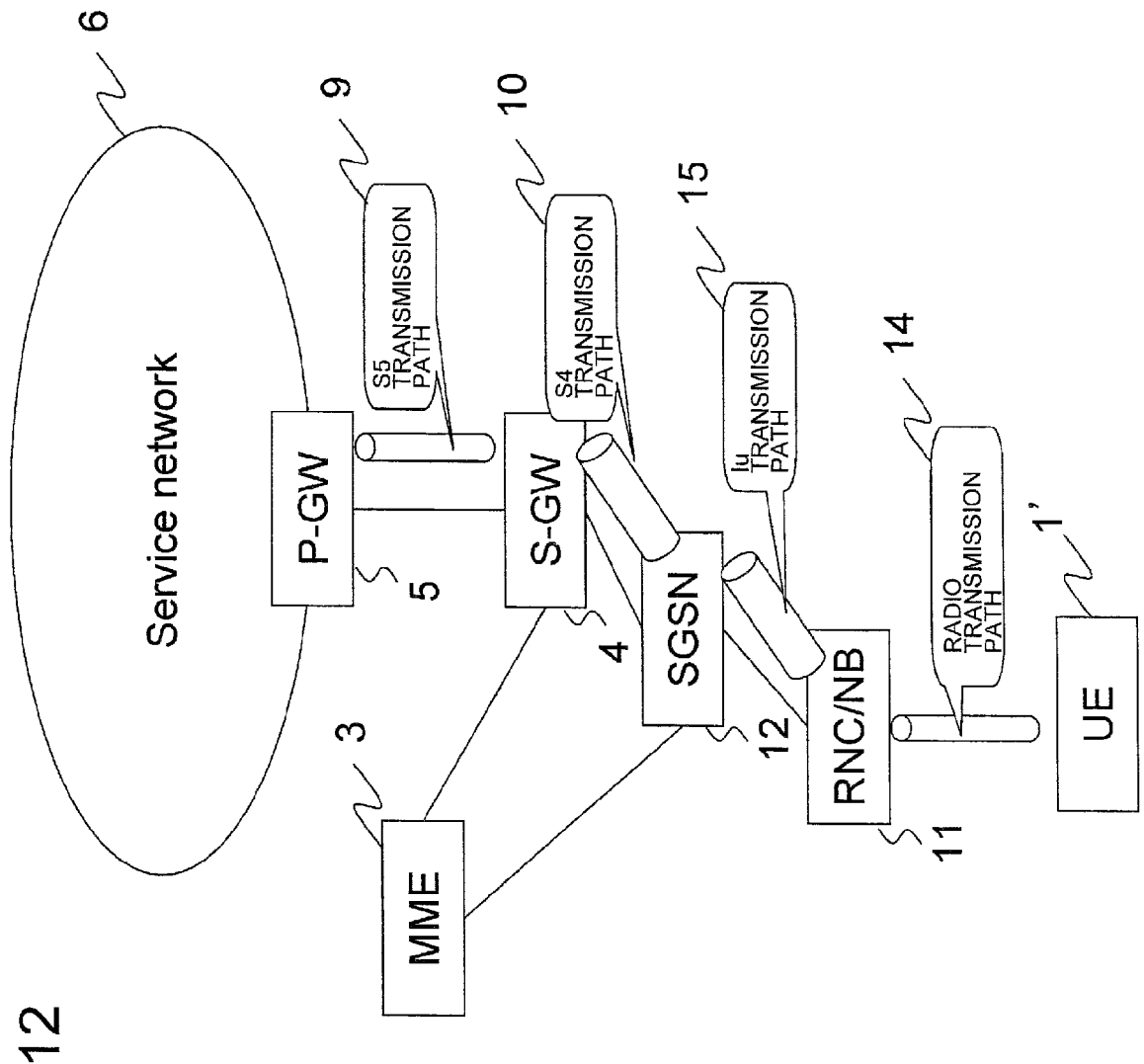
FIG. 12 is a diagram showing a network configuration at the time of connection from UTRAN to EPC in an exemplary embodiment 4 of the present invention.

The following describes a fourth exemplary embodiment of the present invention. FIG. 12 is a diagram illustrating the present exemplary embodiment. Referring to FIG. 12, there is shown an ordinary connection network configuration from the 3GPP (UTRAN (UMTS (Universal Mobile Telecommunication System) Terrestrial Radio Access Network)) to the EPC.

When the terminal (UE) 1' is engaged in communication, a radio transmission path 14, a 1u transmission path 15, an S4 transmission path 10 and an S5 transmission path 9 are set up to allow the terminal 1' to communicate with a service network 6, as shown in FIG. 12. At this time, the respective apparatuses secure transmission path resources to provide for the communication quality, such as QoS, depending on services rendered.

Figure 13:
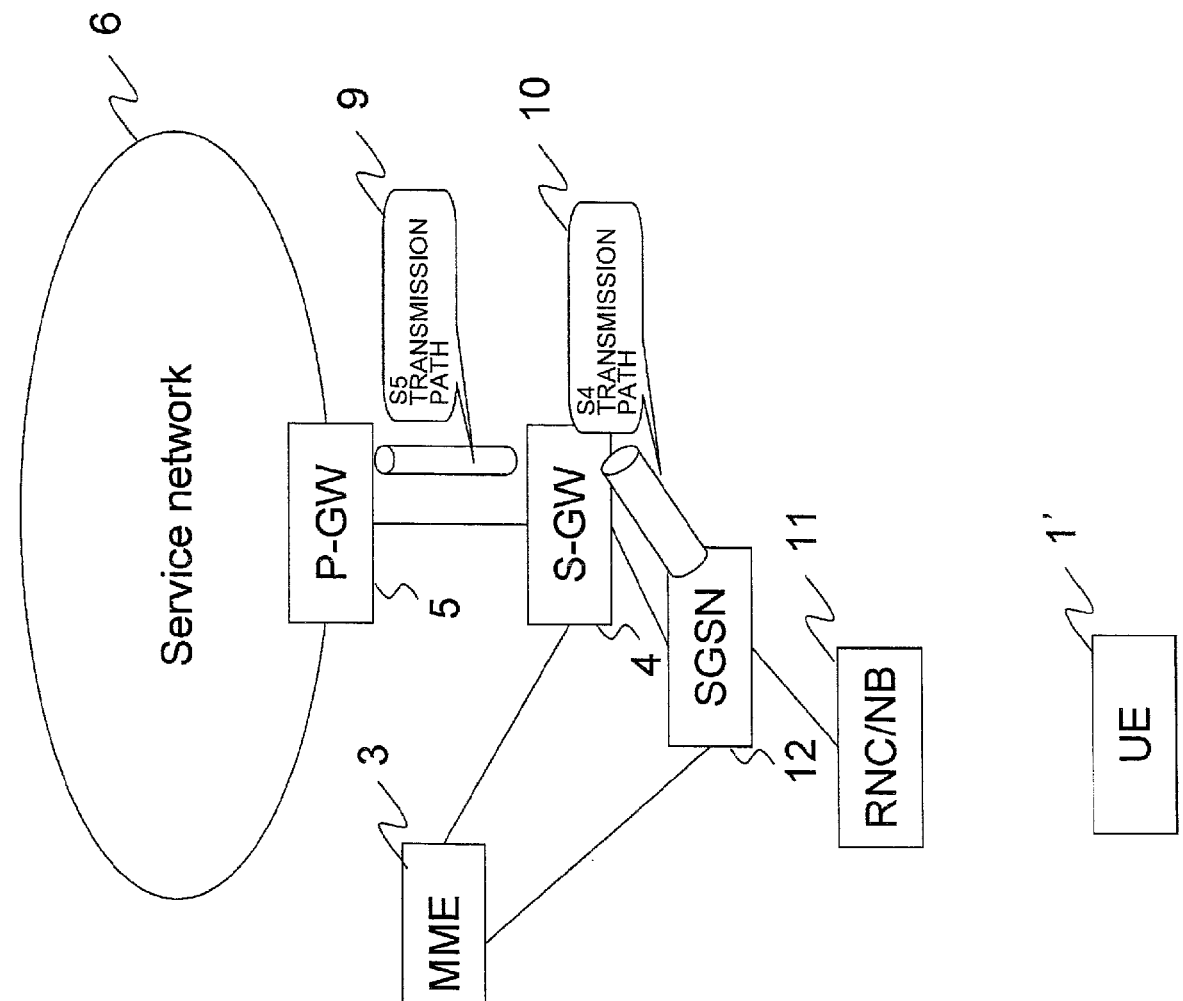
FIG. 13 is a diagram showing a transmission path at the time of connection from UTRAN to EPC in the exemplary embodiment 4 of the present invention, with the terminal in an Idle state.

FIG. 13 shows a state in which the terminal (UE) 1' has registered to the network and secured a transmission path, after which the terminal has fallen into an idle state (non-communicating state).

At this time, the resources of the radio transmission path and the 1u transmission path are released. However, even in such case, resources are being secured on the S4 communication path 10 between the SGSN and S-GW and on the S5 communication path 9 between the S-GW and the P-GW, even though no communication packet flows over these transmission paths. Note that SGSN connects to RNC 11 and S-GW 4 via a 1u transmission path 15 and the S4 transmission path 10, respectively, while also connecting to the MME.

Even in such a case, the resources of the S4 transmission path and the S5 transmission path 5 may be optimized by notifying the respective apparatuses of the communication state of the terminal (UE) in accordance with the present invention.

It is possible to combine the above described exemplary embodiments in a desired manner. The present invention may, of course, be applied to roaming (connection among different service providers). In the case of the roaming (connection among different service providers), the above mentioned S5 transmission path is called an S8 transmission path.

Exemplary Embodiment 5

According to the present invention, the GBR (Guaranteed Bit Rate) transmission path is enabled to be optimized in the EPC for LIPA/SIPTO accessing.

According to the present invention, there is provided a communication system in which a core network on recognition of LIPA/SIPTO connection captures the necessary minimum resources. The communication system according to the present invention directly connects to an external network, without acquiring (capturing) the resources of interfaces between the radio control network and the core network (EPC network), thus providing the resources to other interfaces installed in the core network. No resources are assigned to the S1 interface that connects between the radio control network and the core network. The S5/S8 interface needed in the core network is controlled so as to be supplied with necessary minimum resources.

This invention may be applied to a large number of solutions for LIPA/SIPTO communication captured in TR23.8xy (Local IP Access and Selected IP Traffic Offload).

Figure 14:
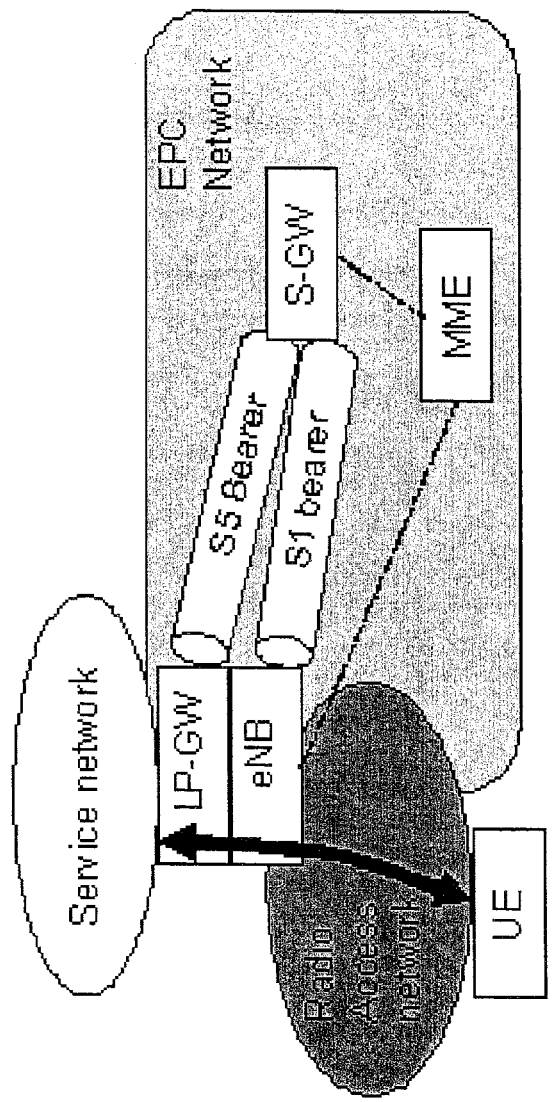
FIG. 14 is a diagram showing a typical LIPA/SIPTO connection model with the UE in ECM-CONENCTED mode.

In the following, UE(User Equipment) is assumed to be in ECM-CONENCTED mode. FIG. 14 illustrates the typical LIPA/SIPTO connection model with the connected mode UE. The LP-GW (Local PDN Gateway) can be co-located with the (H)eNB or logically separated depending on the solution.

As shown in FIG. 14, the common issue we can see is that the assigned S1 bearer and S5/S8 bearer are not used for traffic that is broken out at the (H)eNB. In other words, the resources allocated for the S1 bearer and S5/S8 bearer may be wasted for the LIPA/SIPTO connection. This can happen since entirety of user traffics (i.e., user traffic between a UE and a service network) go through the local P-GW(Local PDN Gateway) located within or close to the (H)eNB and the EPC user plane nodes, i.e., the S-GW(Serving Gateway) (and possibly P-GW depending on the solution), is not involved in such LIPA/SIPTO traffic.

The S1 bearer is not used for LIPA/SIPTO connection during the ECM-CONNECTED mode.

The S5/S8 bearer is not used for LIPA/SIPTO connection during the ECM-CONNECTED mode.

This is not major issue for non-GBR bearers since there is not much resources consumed in EPC. However, for the GBR bearers, the inefficient use of resources would be a major issue for 3G operators.

Next, UE is assumed to be in ECM-IDLE mode. FIG. 2 illustrates a case where the DL(Down Link) packet arrives to the LP-GW while UE is in the ECM-IDLE mode.

Figure 15:
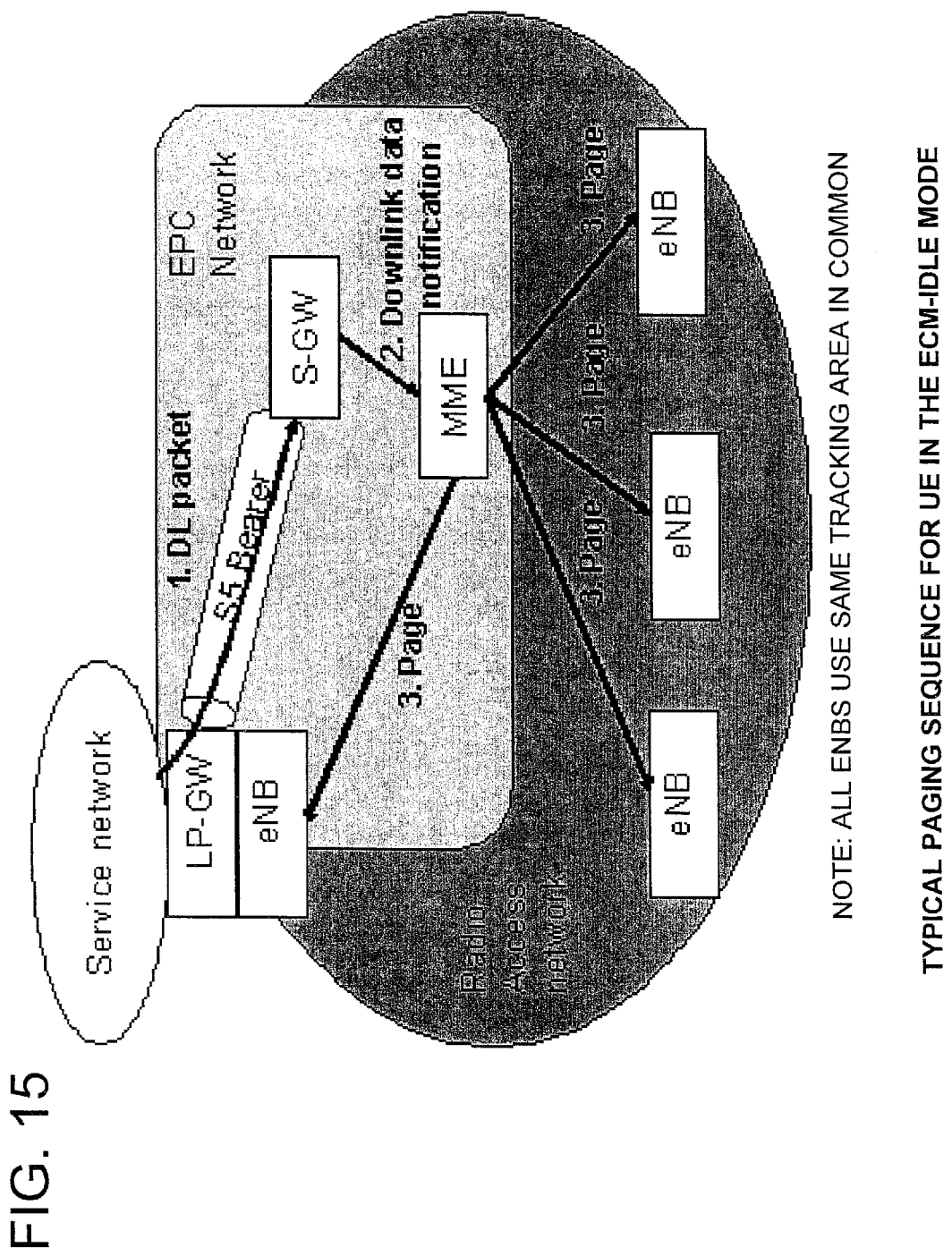
FIG. 15 is a diagram showing a typical paging procedure to the UE in ECM-CONENCTED mode.

Since there is some possibility that the UE is located in the tracking area, the paging has to be performed to all Macro eNBs and HeNBs that are located in the same tracking area. It means that the S-GW and MME(Mobility Management Entity) are involved for the paging procedure as the same way as usual case as specified in the TS 23.401/TS 23.060. In this logic, the S5/S8 EPC bearer IS used for paging procedure as illustrated in the FIG. 15.

The S5/S8 bearer is used for LIPA/SIPTO connection during the ECM-IDLE mode.

Figure 16:
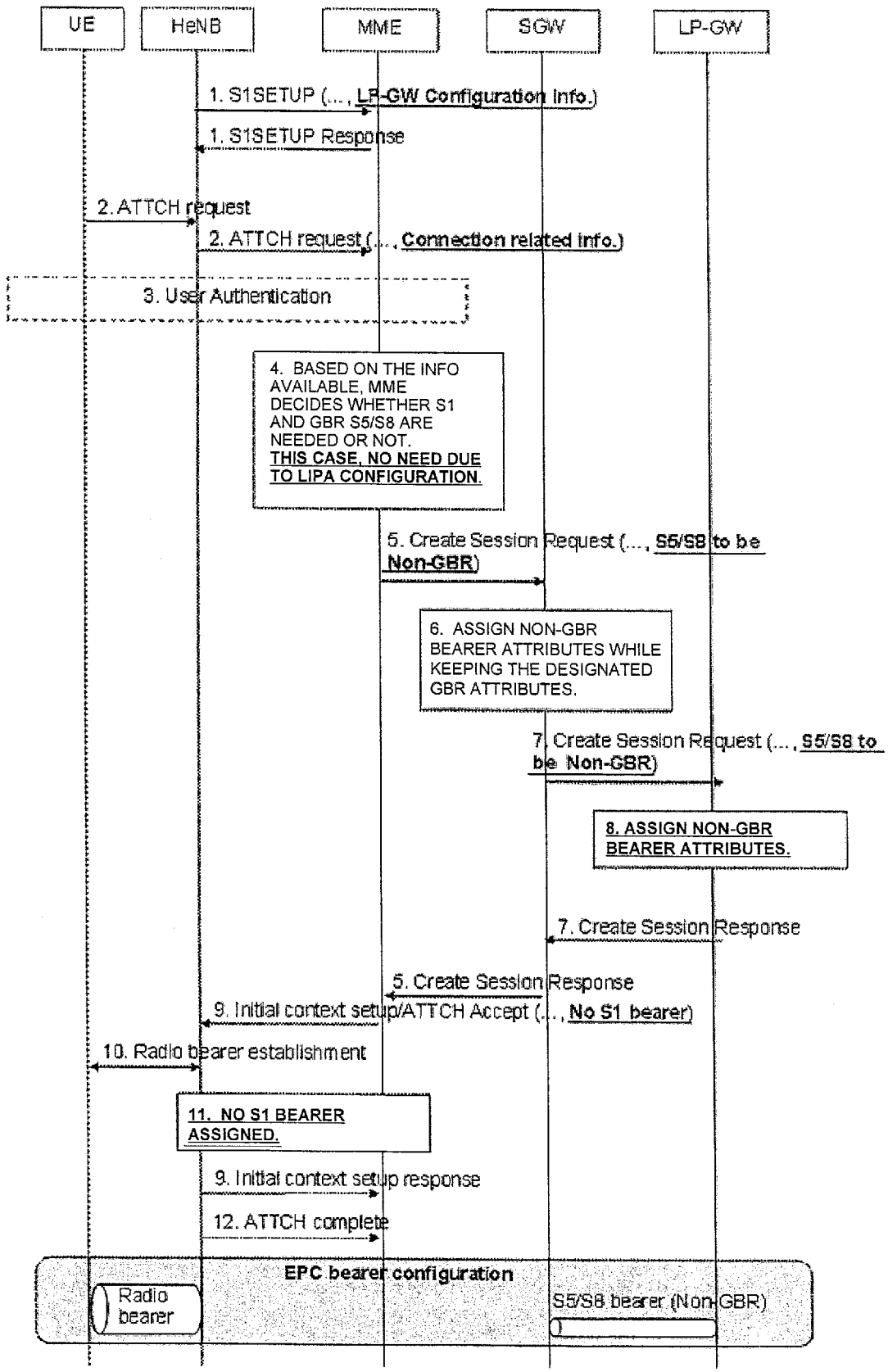
FIG. 16 is a sequence diagram illustrating signaling flow in an exemplary embodiment of the present invention.

The following describes possible enhancements (shown as under-lined characters) in the signaling flows of FIG. 16. The enhancements help overcome the deficiencies outlined above.

Two alternatives are shown that solve the EPC bearer deficiency. The first alternative in the following section (A) proposes that the EPC optimization takes place when the UE attaches to the EPC. The the following section (B) shows a solution where that the EPC optimization takes place after the requested EPC bearers have been established.

In this procedure, the S1 release procedure is used and enhanced for the EPC optimization.

Finally, the following section (C) shows the paging scenario and how the optimized EPC bearers are re-established.

(A) S5/S8 Optimization Alternative 1 (at the Initial ATTACH Procedure)

The general signaling flows for the initial ATTACH procedure in case the LP-GW is collocated or logically very close to the eNB will now be described.

For the GBR connection, the Non-GBR bearer is established over the S5/S8 interface and no bearer is established over the S1 interface. The (small) enhancements are listed below.

The eNB informs the MME about LIPA/SIPTO configuration by means of the S1SUP procedure and/or the ATTACH request/TA update procedures. Based on this information, MME can make a decision whether S1 bearer and S5/S8 bearer would be used or not. In FIG. 16, MME, responsive to an ATTACH request, HeNB attaches connection related information to the ATTACH request and sends the ATTACH request to the MME (2 in FIG. 16). The user authentication (User Authentication) is then carried out (3 of FIG. 16). Based on the information available, the MME decides on whether or not S1 or GBR S5/S8 is necessary. In this case, these are not necessary because the configuration is that of LIPA.

If the MME decides that, due to the LIPA/SISTO connection, the S5/S8 bearer is not used, the MME sends a create session request (Create Session Request) ( . . . , S5/S8 to be Non-GBR)) to the S-GW (5 of FIG. 16). This create session request indicates that a non-GBR bearer (Non-GBR) is to be established for the S5/S8 interface.

In this case, the MME maintains the original GBR attributes (designated GBR attributes) so that the original GBR bearer as requested will be able to be subsequently established on the S5/S8 interface (5 of FIG. 16).

The S-GW requests the LP-GW to set up a non-GBR bearer for S5/S8 interface (Create Session Request ( . . . , S5/S8 to be Non-GBR)) (7 of FIG. 16). The LP/GW assigns non-GBR bearer attributes (8 of FIG. 16: Assign Non-GBR bearer attributes). The LP-GW returns a response (Create Session Response) to the S-GW (7 of FIG. 16) and the S-GW returns a response (Create Session Response) to the MME (5 of FIG. 16).

If the MME decides that the S1 bearer is not used due to the LIPA/SISTO connection, the MME sends an initial context setup message indicating that the S1 bearer is not to be established (Initial context setup/Attach Accept ( ) . . . , No S1 bearer) to the HeNB (9 of FIG. 16). Thus, no resources are assigned to the S1 bearer (11 of FIG. 16).

(B) S5/S8 Optimization Alternative 2 (Triggered by S1 Release Procedure)

The following describes the general signaling flows for the S1 release procedure with S5/S8 optimization. According to the present invention, there is proposed that all necessary bearers are established once and relying on the S1 release procedure for the EPC optimization.

Figure 17:
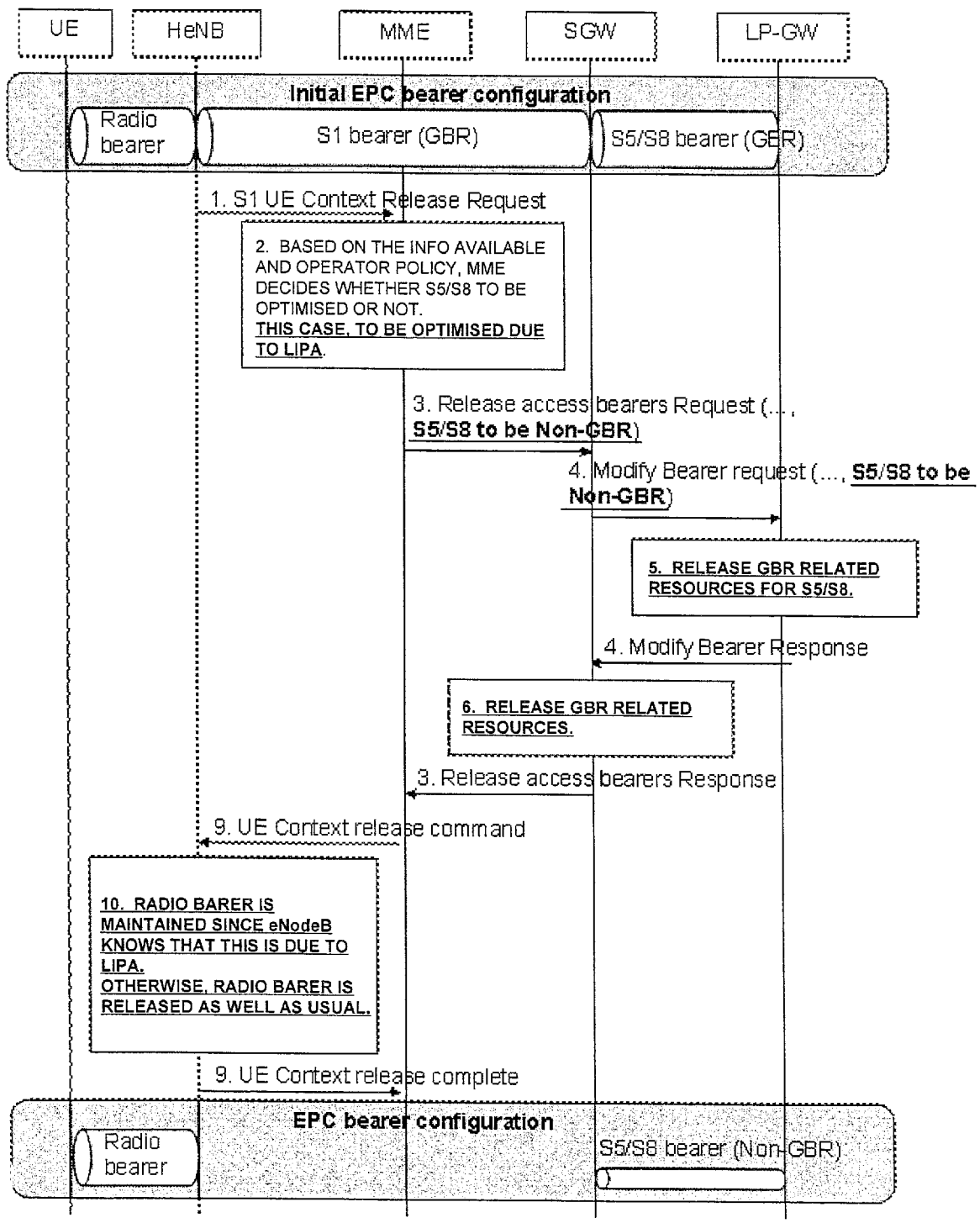
FIG. 17 is a sequence diagram illustrating signaling flow in an exemplary embodiment 6 of the present invention.

FIG. 17 illustrates a situation where the eNodeB decides to initiate an S1 releasing procedure (S1 UE Context Release Request) due to LIPA/SISTO connection. In FIG. 17, the passages shown underlined correspond to the enhancements by the present invention.

On receiving an S1 UE context release message (1 of FIG. 17: S1 UE Context Release Request) from the HeNB, the MME is able to decide, based on the information available and on the operator policy, whether or not to S5/S8 is to be optimized. Since the connection is LIPA, S5/S8 is optimized.

If the MME decides that, since the connection is LIPA/SIPTO, the S5/S8 bearer is to be optimized, the MME sends a release access bearer request (3 of FIG. 17: Release access bearer Request ( . . . , S5/S8 to be Non-GBR)) to the S-GW. The S-GW sends to the LP-GW a modify bearer request (Modify Bearer request) ( . . . , S5/S8 to be Non-GBR) that indicates that a non-GBR bearer is to be established for the S5/S8 interface (4 of FIG. 17). The LP-GW releases the GBR related resources of S5/S8 (5 of FIG. 17). The LP-GW returns a modify bearer response (Modify Bearer Response) to the S-GW (4 of FIG. 17), in response to which the S-GW releases the GBR related resources to return to the MME a release access bearers response (Release Access Bearers Response) (3 of FIG. 17).

On receiving from the MME a UE context release command message (9 of FIG. 17: UE Context release command), the HeNB does not release the radio bearer (10 of FIG. 17). The reason is that the HeNB knows that the UE context release procedure has been initiated because of the LIPA/SISTO connection. Otherwise, the radio bearer is released. The HeNB notifies the MME of the completion of the UE context release (9 of FIG. 17: UE Context release complete).

According to the present invention, the following points of enhancement may bring a lot of benefits for the 3G operator. The reason is that the proposed points of enhancement may optimize EPC resource assignment to help the operator to minimize network costs.

The S1/1u bearer resources may be removed/diminished for LIPA/SIPTO traffic. This is possible since all LIPA/SIPTO traffic that is broken out locally does not traverse the S1/1u bearer and hence is not in need of any bearer resources.

When the GBR bearer is used for LIPA/SIPTO connection, the S5/S8 or Gn/Gp bearer may also be optimized by downgrading it to a Non-GBR bearer. For example, if it has become necessary for the UE to set up non-LIPA/SIPTO connection due to idle mode mobility to non-LIPA/SIPTO macro eNodeB, the GBR bearer is re-established on the S5/S8 or Gn/Gp reference point. The S5/S8 or Gn/Gp bearer may not be removed in the same way as the S1/1u bearer since these bearers may also be used for a DL (Down Link) packet arrival while the UE is in the ECM-IDLE mode.

Figure 18:
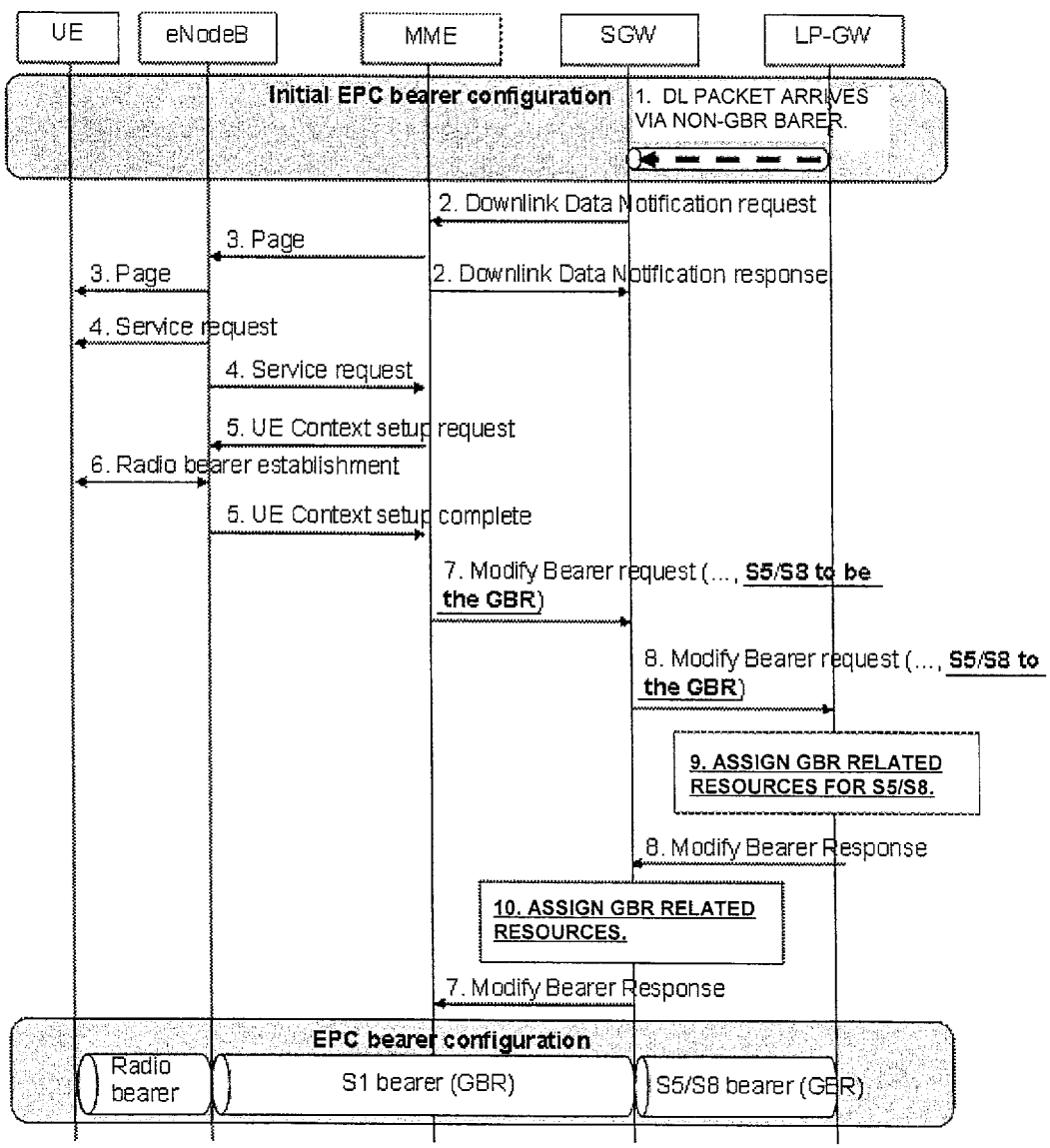
FIG. 18 is a sequence diagram illustrating signaling flow in the exemplary embodiment 6 of the present invention.

FIG. 18 shows a signaling flow for a GBR bearer re-establishment procedure in case a DL (Down Link) packet has arrived. Referring to FIG. 18, the passages shown underlined corresponds to the enhancements.

A DL packet arrives at S-GW from LP-GW via a non-GBR bearer (1 of FIG. 18). The S-GW sends to the MME a DL data notification request (Downlink Data Notification request) (2 of FIG. 18). The MME causes the eNodeB to perform the paging (3 of FIG. 18). The eNodeB sends a service request to the UE (4 of FIG. 18). The MME sends a context setup request (UE Context setup request) to the eNodeB (5 of FIG. 18) so that a radio bearer will be established between the UE and the eNodeB (6 of FIG. 18). The eNodeB then notifies the MME of the completion of UE context setup (UE Context setup response) (5 of FIG. 18).

The MME sends to the S-GW a modify bearer request (Modify Bearer request ( . . . , S5/S8 to be the GBR)), which modifies S5/S8 into a GBR bearer (7 of FIG. 18). The S-GW sends to the LP-GW a modify bearer request (Modify Bearer request) ( . . . , S5/S8 to be the GBR)) (8 of FIG. 18). The LP-GW assigns GBR resources to S5/S8 (9 of FIG. 18) to send a modify bearer response (Modify Bearer response) to the S-GW (8 of FIG. 18). The S-GW assigns GBR resources to S5/S8 (10 of FIG. 18) and sends a modify bearer response to the MME (7 of FIG. 18). As a result, the EPC bearer configuration includes a S5/S8 bearer (GBR), S1 bearer (GBR) and a radio bearer.

The above mentioned enhancements are proposed to be captured in TR23.8xy (Local IP Access and Selected IP Traffic Offload).

The solutions for the local IP access (LIPA) for the Home (e)NodeB subsystem and selected IP traffic offload (SIPTO) shall fulfill the service requirements described in TS22.220.

The solutions for the SIPTO for the Home (e)NodeB subsystem shall satisfy service requirements described in 3GPP TS 22.101.

The solutions for the SIPTO for the macro (3G and LTE) shall fulfill the following architectural requirements:

It shall be possible to perform traffic offload without user interaction.

For UTRAN, the traffic offloading shall be performed on or above an RNC node.

The impact on the existing network entities and procedures by introducing traffic offload shall be minimized.

The H(e)NBs supporting LIPA shall be able to provide Intranet type access to the home based network.

It should be noted that if the home based network provides a route to other private networks or to the public internet, then these networks may be accessible via LIPA.

Resource allocations in the EPC for LIPA/SIPTO traffic shall be minimized: It shall be possible not to establish the S1/1u bearer for the LIPA/SIPTO traffic that has been broken out locally in the macro or home (e)NB.

If a GBR bearer is used for the LIPA/SIPTO connections, it shall be possible to optimize the S5/S8 or Gn/Gp bearer by reducing the allocated resources or downgrading it to a Non-GBR bearer.

The full GBR bearer resources over the S5/S8 or Gn/Gp reference points shall be re-established once the LIPA/SIPTO traffic is not broken out locally anymore, for example, in case of idle mode mobility to a macro cell.

Following listed are terms and definitions used in the present specification, in which the left terms and right terms in the equations have the same meaning.

LIPA/SIPTO connection=LIPA/SIPTO service
S5/S8 interface=S5/S8 reference point
eNB=eNodeB=enhanced Node B
H(e)NB=Home(e) Node B=Home Node B and Home enhanced Node B
HeNB=Home enhanced Node B
page=paging=paging procedure The particular exemplary embodiments or examples may be modified or adjusted within the gamut of the entire disclosure of the present invention, inclusive of claims, based on the fundamental technical concept of the invention. Further, a variety of combinations or selection of elements disclosed herein may be made within the framework of the claims. That is, the present invention may cover a wide variety of modifications or corrections that may occur to those skilled in the art in accordance with the entire disclosure of the present invention, inclusive of claim and the technical concept of the present invention.

The invention claimed is:

1. A communication system comprising a terminal and a core network including a node, wherein the node, in accordance with a connection state of the terminal, releases a transmission path resource which is made unnecessary due to LIPA (Local IP access) or SIPTO (Selected IP traffic offload) connection configuration.

2. The communication system according to claim 1, wherein the core network includes:
   a mobility management entity (MME) that performs mobility management; and
   a serving gateway (S-GW) that handles packet forwarding, wherein the mobility management entity notifies to the serving gateway that the connection configuration is that of the LIPA or SIPTO, and the serving gateway releases an unneeded transmission path resource based on the notification on the connection configuration notified from the mobility management entity to optimize the transmission path resource.

3. The communication system according to claim 2, further comprising a base station, wherein the base station informs the mobility management entity, at a time of connection setup of a transmission path between the base station and the mobility management entity, about whether or not the base station has a capability to forward a packet directly from a radio access network including the base station to an external packet network outside the core network, the mobility management entity, in response to a request for connection setup from the terminal to the base station selects a connection configuration to be notified to the serving gateway, from a connection destination network specified in the request for connection setup and from the capability information of the base station, and notifies the serving gateway of the connection configuration selected, and the serving gateway secures at least a resource of a transmission path to which the serving gateway connects and releases one or more unneeded transmission path resources in accordance with the connection configuration notified.

4. The communication system according to claim 3, wherein the base station sends a context releasing request by the terminal which becomes to be in a non-communicating state to the mobility management entity, the mobility management entity, in sending to the serving gateway a request of removal of the information regarding the transmission path between the mobility management entity and the base station, appends to the request a connection state that the terminal is in the non-communicating state and sends the request to the serving gateway, the serving gateway notifies to the packet data network gateway that the terminal is in a non-communicating state, and the serving gateway and the packet data network gateway perform optimization of the transmission path resources already secured.

5. The communication system according to claim 3, wherein the terminal is directly connected from the radio access network to the external packet network without catching an interface resource between the radio access network and the core network, providing a resource to an other interface installed in the core network.

6. The communication system according to claim 5, wherein in the LIPA/SIPTO connection configuration, necessary minimum resources are provided to an S5/S8 interface needed for the core network.

7. The communication system according to claim 5, wherein in case a GBR (Guaranteed Bit Rate) bearer is used for the LIPA/SIPTO connection, S5/S8 or Gn/Gp bearer is able to be optimized by reducing resources allocated or by downgrading to a non-GBR bearer.

8. The communication system according to claim 2, wherein the core network includes:

a packet data network gateway (P-GW: PDN Gateway) that makes connection to an external packet network, wherein the serving gateway notifies the packet data network gateway of a connection state of the serving gateway, based on the connection configuration of the terminal notified from the mobility management entity, and the packet data network gateway and the serving gateway perform at least the optimization of a transmission path resource between the packet data network gateway and the serving gateway based on the connection configuration.

9. The communication system according to claims 2, the system further comprising:

a radio network controller (RNC); and an SGSN (Serving GPRS Support Node) that is connected to the radio network controller and the serving gateway via respective transmission paths and also connected to the mobility management entity, the SGSN performing optimization of a transmission path resource between the SGSN and the serving gateway.

10. The communication system according to claim 1, wherein the core network includes:

an SGSN (Serving GPRS Support Node) and a GGSN (Gateway GPRS Support Node), wherein the SGSN notifies the GGSN of the connection state, and the GGSN performs optimization of the transmission path resources between the GGSN and the SGSN based on the connection state notified.

11. The communication system according to claim 1, wherein the core network performs control to perform necessary minimum resource allocation, when the core network recognizes the LIPA/SIPTO connection configuration.

12. The communication system according to claim 11, wherein in the LIPA/SIPTO connection configuration, a user traffic goes through a local packet data network provided within or near the base station, an EPC (Evolved Packet Core) user plane node, including at least one serving gateway in the core network, not taking part in the user traffic.

13. The communication system according to claim 12, wherein an S1 interface, used for connection between the radio access network and the core network, is controlled not to be used for the LIPA/SIPTO connection.

14. A communication control method comprising:

a core network obtaining a connection state of a terminal; and the core network, in accordance with the connection state of the terminal, releasing a transmission path resource which is made unnecessary due to LIPA (Local IP access) or SIPTO (Selected IP traffic offload) connection configuration.

15. The communication control method according to claim 14, comprising a mobility management entity (MME) which performs mobility management, notifying to a serving gateway (S-GW) which handles packet forwarding, that the connection configuration is that of the LIPA or SIPTO; and the serving gateway releasing an unneeded transmission path resource based on the notification on the connection configuration to optimize the transmission path resource.

16. The communication control method according to claim 15, comprising:

a base station informing the mobility management entity, at a time of connection setup of a transmission path between the base station and the mobility management entity, about whether or not the base station has a capability to forward a packet directly from a radio access network including the base station to an external packet network outside the core network, the mobility management entity, in response to a request for connection setup from the terminal to the base station, selecting a connection configuration to be notified to the serving gateway, from a connection destination network specified in the request for connection setup and from the capability information of the base station, and notifies the serving gateway of the connection configuration selected; and the serving gateway securing at least a resource of a transmission path to which the serving gateway connects and releasing one or more unneeded transmission path resources in accordance with the connection configuration notified.

17. The communication control method according to claim 16, comprising:

the base station sending a context releasing request by the terminal which becomes to be in a non-communicating state to the mobility management entity;

the mobility management entity, in sending to the serving gateway a request of removal of the information regarding the transmission path between the mobility management entity and the base station, appending to the request a connection state that the terminal is in the non-communicating state and sends the request to the serving gateway;

the serving gateway notifying to the packet data network gateway that the terminal is in a non-communicating state; and the serving gateway and the packet data network gateway performing optimization of the transmission path resources already secured.

18. The communication control method according to claim 15, comprising:

the serving gateway notifying the state of connection of the serving gateway to a packet data network gateway (P-GW: PDN Gateway) which connects to an external packet network, based on the connection configuration of the terminal notified from the mobility management entity; and the packet data network gateway and the serving gateway performing optimization of transmission path resources between the packet data network gateway and the serving gateway based on the connection configuration notified.

19. The communication control method according to claim 14, comprising:

an SGSN (Serving GPRS Support Node) notifying a GGSN (Gateway GPRS Support Node) of the connection state; and the GGSN optimizing the transmission path resources between the GGSN and the SGSN based on the connection state notified.

20. A node apparatus provided on a core network, wherein the node apparatus obtains information on a connection configuration for a terminal; and the node apparatus releases a transmission path resource which is made unnecessary due to LIPA (Local IP access) or SIPTO (Selected IP traffic offload) connection configuration, when the information on the connection configuration indicates LIPA or SIPTO.

* * * * *

UNITED STATES PATENT AND TRADEMARK OFFICE
CERTIFICATE OF CORRECTION

PATENT NO. : 8,705,354 B2  Page 1 of 1
APPLICATION NO. : 13/395360
DATED : April 22, 2014
INVENTOR(S) : Takano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 185 days.

Signed and Sealed this

Twenty-ninth Day of September, 2015

Michelle K. Lee
*Director of the United States Patent and Trademark Office*